(12) United States Patent
Hansen et al.

(10) Patent No.: US 7,217,134 B2
(45) Date of Patent: May 15, 2007

(54) ACCESSIBILITY OF TESTING WITHIN A VALIDITY FRAMEWORK

(75) Inventors: Eric G. Hansen, Fairless Hills, PA (US); Robert J. Mislevy, Lawrenceville, NJ (US); Linda S. Steinberg, Philadelphia, PA (US)

(73) Assignee: Educational Testing Service, Princeton, NJ (US)

( * ) Notice: Subject to any disclaimer, the term of this patent is extended or adjusted under 35 U.S.C. 154(b) by 143 days.

(21) Appl. No.: 11/054,019

(22) Filed: Feb. 9, 2005

(65) Prior Publication Data

US 2005/0175974 A1 Aug. 11, 2005

Related U.S. Application Data

(60) Provisional application No. 60/614,149, filed on Sep. 29, 2004, provisional application No. 60/543,027, filed on Feb. 9, 2004, provisional application No. 60/543,080, filed on Feb. 9, 2004.

(51) Int. Cl.
G09B 23/28 (2006.01)
(52) U.S. Cl. .................. 434/322; 434/236; 434/362
(58) Field of Classification Search ............... 434/118, 434/112, 236, 322, 323, 350, 362, 365; 705/2
See application file for complete search history.

(56) References Cited

U.S. PATENT DOCUMENTS 6,056,556 A * 5/2000 Braun et al. ................ 434/323
6,108,635 A * 8/2000 Herren et al. .................. 705/2
2004/0076930 A1* 4/2004 Steinberg et al. ............. 434/81

OTHER PUBLICATIONS

Mislevy, R. J., Steinberg, L. S., & Almond, R. G. "*On The Structure Of Educational Assessments*. Measurement: Interdisciplinary Research and Perspectives."2003, pp. 3-62, vol. 1, No. 1. Lawrence Erlbaum Associates, Inc.
Landau, S. "*Development Of An Audio-Tactile Accommodation For Delivery Of Standardized Tests To Students Who Are Blind Or Visually Impaired—Interim Progress Report* (Feb. 2004)". (U.S. Department of Education, SBIR Grant ED-02-CO-0054). Touch Graphics Company. New York.
Messick, S. "*The Interplay Of Evidence And Consequences In The Validation Of Performance Assessments*."Mar. 1994. Education Researcher, vol. 23, No. 2, pp. 13-23.

(Continued)

Primary Examiner—Joe H. Cheng (57) ABSTRACT

Methods for designing an assessment and providing accessibility features for a test taker profile are disclosed. A test taker profile, including multiple knowledge, skill and other attribute(s) (KSAs), is defined in which each KSA has a specific level. Each KSA is designated as either a focal KSA (an essential part of the targeted proficiency to be measured) or an ancillary KSA (not an essential part). For each focal KSA, a focal value (the value that the test taker must have to possess a high level in the targeted proficiency) is defined. For a particular test design alternative (which may include an accessibility feature), a requirement is determined for each KSA. An accessibility feature is selected which avoids indications of invalidity, including: a mismatch between the targeted proficiency and the expected proficiency; the test taker profile does not satisfy all ancillary requirements; and focal requirements are either excessive or insufficient.

14 Claims, 5 Drawing Sheets

OTHER PUBLICATIONS

Spearman, C. "*General Intelligence" Objectively Determined And Measured*. American Journal of Psychology, 1904, vol. 15, pp. 201-293.

Linn, R. L. "*Validation Of The Uses And Interpretations Of Results Of State Assessment And Accountability Systems.*" Chapter 2. Large-Scale Assessment Programs For All Students: Validity, Technical Adequacy, and Implementation. 2002. pp. 27-48. G. Lawrence Erlbaum Associates. Mahwah, New Jersey.

Kane, M. "*An Argument-Based Approach To Validity.*"Quantitative Methods in Psychology, Psychological Bulletin, 1992, pp. 527-535. vol. 112, No. 3.

National Research Council. "*Keeping Score For All: The Effects Of Inclusion And Accommodation Policies On Large-Scale Educational Assessment.*"Committee on Participation of English Language Learners and Students with Disabilities in NAEP and Other Large-Scale Assessments. 2004, pp. 1-9, 103-125. National Academy of Sciences. Washington, DC.

Heath, A., & Hansen, E. G. "*Guidelines for Testing and Assessment.*"IMS Guidelines for Developing Accessible Learning Applications. 2002. IMS Consortium. Retrieved Jul. 15, 2005 from: http://www.imsglobal.org/accessibility/accessiblevers/sec9.html, 8 pages.

Haertel, E. H. "*Evidentiary Argument And The Comparability Of Scores From Standard Versus Nonstandard Test Administrations.*"2003, 17 pages.

Haertel, E. H., & Wiley, D. A. "*Comparability Issues When Scores Are Produced Under Varying Testing Conditions.*"2003, 13 pages.

Elliott, S. N., & Roach, A. T. "*The Impact Of Providing Testing Accommodations To Students With Disabilities.*"2002. Retrieved May 27, 2003 from http://www.wcer.wisc.edu/testacc/Publications/aera2002.doc, 22 pages.

Aguirre-Munoz, Z., & Baker, E. "*Improving The Equity And Validity Of Assessment-Based Information Systems* (CSE Tech. Rep. No. 462)."Los Angeles: National Center for Research on Evaluation, Standards, and Student Testing (CRESST). 1997. Retrieved Apr. 29, 2003, from http://www.cse.ucla.edu/CRESST/Reports/TECH462.pdf, 18 pages.

Haertel, E. H., & Linn, R. L. "*Comparability.*"Technical Issues In Large-Scale Performance Assessment. 1996. pp. 59-78. Washington, DC: U.S. Department of Education, Office of Educational Research and Improvement. In G. W. Phillips (Ed.).

Wainer, H., & Thissen, D. "*On Examinee Choice In Educational Testing.*"Review of Educational Research, 1994. pp. 159-195. vol. 64, No. 1.

Willingham, W. W., Ragosta, M., Bennett, R. E., Braun, H., Rock, D. A., & Powers, D. E. (Eds.). *Testing Handicapped People*. 1988. Allyn and Bacon, Inc., Boston., p. 144-185.

Allan, J. M., Bulla, N., & Goodman, S. A. "*Test Access—Guidelines For Computer Administered Testing.*"2003. American Printing House for the Blind. Louisville, KY. Retrieved Jul. 13, 2005 from: http://www.aph.org/tests/access, 87 pages.

Abedi, J., Courtney, M., & Leon, S. "*Effectiveness And Validity Of Accommodations For English Language Learners In Large-Scale Assessments*. CSE Report 608."2003. Los Angeles, CA. (Center for the Study of Evaluation).: University of California, National Center for Research on Evaluation, Standards, and Student Testing., 120 pages.

Abedi, J., & Dietel, R. "*Challenges in the No Child Left Behind Act for English Language Learners.*"CRESST Policy Brief No. 7. 2004, 6 pages.

Abedi, J., Hoffstetter, C. H., & Lord, C. "*Assessment Accomodations For English Language Learners: Implications For Policy-Based Empirical Research.*"Review of Educational Research, 2004. pp. 1-28. vol. 74, No. 1.

Sheinker, A., & Barton, K. E. "*Guidelines For Inclusive Test Administration 2005.*"2004. CTB McGraw-Hill. Monterey, CA. http://www.ctb.com/media/articles/pdfs/general/guidelines_inclusive.pdf, 17 pages.

National Assessment Governing Board. "*Reading Framework For The 2003 National Assessment Of Educational Progress.*"Washington DC: National Assessment Governing Board. 2002., 84 pages.

Pitoniak, M. J., & Royer, J. M. "*Testing Accommodations For Examinees With Disabilities: A Review Of Psychometric, Legal And Social Policy Issues.*"Review of Educational Research, 2001. pp. 53-104. vol. 71.

Phillips, S. E. "*Legal Issues Affecting Special Populations In Large-Scale Testing Programs.*"Large-Scale Assessment Programs For All Students: Validity, Technical Adequacy, And Implementation. 2002. pp. 109-148. Lawrence Erlbaum. Mahwah, NJ.

Sheehan, K. M., & Ginther, A. "*What Do Multiple Choice Verbal Reasoning Items Really Measure*? An Analysis of the Cognitive Skills Underlying Performance on TOEFL Reading Comprehension Items."Jan. 2002. 48 pages.

Hanson, E. G., Forer, D. C., & Lee, M. J. "*Toward Accessible Computer-Based Tests: Prototypes for Visual and Other Disabilities.*"ETS TOEFL Research Reports RR-78. Nov. 2004., 113 pages.

Allman, C. *Making "Tests Accessible For Students With Visual Impairments: A Guide To Test Publishers, Test Developers, And State Assessment Personnel*"(2nd Ed.). Jun. 2004. American Printing House for the Blind. Louisville, KY. Retrieved Dec. 1, 2004, from http://www.aph.org/tests/access2/ , 55 pages.

Hansen, E. G., Mislevy, R. J., & Steinberg, L. S."*Evidence-Centered Assessment Design For Reasoning About Testing Accommodations In NAEP Reading And Math.*"2003, 151 pages.

Messick, S. "*Validity.*"Educational Measurement. 3rd ed. 1989. pp. 13-103. Macmillan. New York.

Elliott, S. N., Kratochwill, T. R., & Schulte, A. G. "*The Assessment Accommodations Checklist.*" Helping Teachers and Parents Support All Students' Participation in Testing Programs. 1999. CTB McGraw-Hill. Monterey, CA., 6 pages.

Mislevy, R. J. "*Evidence And Inference In Educational Assessment.*"Psychometrika. 1994. vol. 59, No. 4. pp. 439-483.

"*Web Content Accessibility Guidelines 1.0"W3C Recommendation* May 5, 1999. Retrieved Jul. 13, 2005 from the World Wide Web Consortium site: http://www.w3.org/TR/WAI-Webcontent/. Editors: Chisholm, W., Vanderheiden, G., & Jacobs, I. , 53 pages.

Center for Applied Special Technology. "*NCAC*"Undated. Retrieved Jul. 13, 2005, from http://www.cast.org/policy/ncac/index.html, 2 pages.

Cronbach, L. J., & Meehl, P. E. "*Construct Validity In Psychological Tests.*"Psychological Bulletin, vol. 52, No. 4. Jul. 1955. pp. 281-302.

American Educational Research Association, American Psychological Association & National Council on Measurement in Education. "*9. Testing Individuals of Diverse Linguistic Backgrounds.*"Standards for Educational and Psychological Testing. 1999. pp. 91-100.

American Educational Research Association, American Psychological Association & National Council on Measurement in Education. "*10. Testing Individuals with Disabilities.*"Standards for Educational and Psychological Testing. 1999. pp. 101-108.

Architectural and Transportation Barriers Compliance Board. "*Electronic And Information Technology Accessibility Standards*"(Section 508). 2000. Retrieved Jul. 13, 2005, from http://www.access-board.gov/sec508/508standards.htm. Published in the federal Register on Dec. 21, 2000, 49 pages.

Bennett, R. E. "*Research Memorandum. Computer-Based Testing For Examinees With Disabilities: On The Road To Generalized Accommodation.*"ETS RM-95-1. May 1995. Educational Testing Service. Princeton, NJ, 23 pages.

\* cited by examiner

ACCESSIBILITY OF TESTING WITHIN A VALIDITY FRAMEWORK

CROSS-REFERENCE TO RELATED APPLICATIONS

This application claims priority to the U.S. Provisional Patent Application entitled "Accessibility of Tests Within a Validity Framework," assigned Ser. No. 60/543,027, and filed Feb. 9, 2004, and to the U.S. Provisional Patent Application entitled "Evidence Centered Assessment Design for Reasoning about Accommodations for Individuals with Disabilities in NAEP Reading and Math," assigned Ser. No. 60/543,080, and filed Feb. 9, 2004, and to the U.S. Provisional Application entitled "Accessibility of Computer Based Testing for Individuals with Disabilities and English Language Learners within a Validity Framework" assigned Ser. No. 60/614,149, and filed on Sep. 29, 2004.

TECHNICAL FIELD

The present invention relates generally to the field of assessment development. The present invention relates to methods for determining the proper format in which to provide an assessment to a particular student and for informing policies and plans for developing and using such formats for test delivery systems and for individual tests. The student may have one or more disabilities, speak or write in a particular primary language, or have other conditions which affect the format of the assessment provided to the student.

BACKGROUND

Testing is commonplace in today's society. Testing is often required to obtain access to schools, jobs, or organizations. While tests are easy to administer to the general population, it is important that tests are also designed to be as accessible as possible to all individuals, including individuals with disabilities or those having other characteristics that separate them from typical test takers. Exemplary features that could be considered when designing and administering assessments include large print and enlarged computer fonts, Braille (hard copy or refreshable), audio (also called "readaloud": synthesized speech, live reader, prerecorded audio), raised-line (tactile drawings, sometimes with Braille labels), visual highlighting on a computer display as text is read aloud, color/contrast modification, spelling and grammar checkers, dictionaries, and extended testing time. Such accessibility features and formats may be allowed based on prior approval (accommodations) or may be allowed to virtually anyone who needs or desires the feature ("universal design" features).

Synthesized speech for computers can be provided in at least two ways: screen readers and self-voicing applications. Screen reader programs are commercial text-to-speech software packages that allow a person who is blind, or has certain other specific disabilities, to interact with a variety of other software, such as word processors, spreadsheets and Web browsers. The most popular screen reader programs are very feature rich but often require considerable practice for effective use. Self-voicing applications are developed to provide built-in speech synthesis and therefore do not rely on commercial screen reader technology.

A refreshable Braille display has hardware that raises and lowers Braille dot patterns on command from a computer. Users can read the Braille dot patterns by moving their fingertips across the Braille panel, much as they would read the Braille dot patterns on paper. Refreshable Braille displays enable access to computers by individuals who are deaf-blind.

Unfortunately, accessibility features that may be useful in overcoming accessibility barriers can, in some instances, invalidate test results. For example, a person with a spelling disability (dysorthographia) could argue that their use of spelling checker software would help overcome an accessibility barrier on educational tests that involve writing. If a test is intended to measure spelling ability, though, such an accommodation would tend to invalidate the test results by providing an unfair advantage to such a person.

A committee of the National Research Council (NRC) that examined accommodation policies for the United States' National Assessment of Educational Progress (NAEP) and other large-scale assessments noted that determining which accommodation is right for a particular circumstance is difficult. The accommodation must at the same time be directly related to the disability or lack of fluency for which it is to compensate and be independent of the constructs on which the test taker is to be assessed. An example of this difficulty concerns the use of a "readaloud" accessibility feature. The readaloud capability may enable individuals with visual impairments and certain learning disabilities to take a particular assessment. The readaloud accommodation is allowed on several state assessments of reading. However, the United States' National Assessment of Educational Progress (NAEP) does not allow test content to be read aloud on its reading assessment. The NAEP considers that accommodation to be incompatible with the nature of the proficiency being measured (reading). This discrepancy underscores the issue of identifying principles, criteria and/or procedures for determining which accessibility features can be offered without compromising the validity of the scores.

A committee of the National Research Council that examined accommodation policies for the NAEP and other large-scale assessments stated that existing research does not provide definitive evidence about which procedures will produce the most valid estimates of performance for students with disabilities and English language learners. The investigation that led to this conclusion included a review of research on the "interaction hypothesis," which posits that a valid accommodation will improve scores for students who need the accommodation but not for the students who do not need the accommodation; studies based on the interaction hypothesis have not provided evidence sufficient for determining the validity of an accommodation. The NRC committee concluded that by urging sponsors of large-scale assessment programs to identify the inferences that they intend to make from their assessment results and to embark on a research agenda that is guided by the claims and counterclaims for intended uses of results in the validation argument they have articulated.

Evidence Centered Assessment Design (ECD) was originally formulated at Educational Testing Service. ECD seeks to make the evidentiary argument embodied in assessment systems more explicit and clarify assessment design decisions. Structures and supporting rationales for the evidentiary argument of an assessment are designed to make the argument easier to examine, share and refine.

Recently, ECD researchers have sought to determine how validity is impacted by accessibility features provided to students with disabilities and English language learners. These extensions include structures that represent and explore a core validity issue, specifically, the alignment between (a) what one intends to measure and (b) what one is actually measuring in operational settings. In particular, alignment favors validity, and misalignment favors invalidity.

A need exists for methods of applying this approach to enable those having characteristics differing from the general population to have adequate access to tests.

A need exists for a conceptual framework that clarifies which features to provide with accessible testing systems.

A still further need exists for a conceptual framework that clarifies how much control to allow test takers in the use of such features.

A further need exists for enabling test designers and testing system designers to build accessibility into their designs from the earliest stages, thereby overcoming barriers faced by individuals with disabilities and English language learners.

The present invention is directed to solving one or more of the above-listed problems.

NOMENCLATURE

The term "accommodation," as used herein, refers to any action taken in response to a determination that, for example, an individual's disability and/or level of language development require a departure from an established protocol. Accommodations are typically categorized into five categories: setting (e.g., separate testing location, individual administration); timing/scheduling (e.g., extended testing time, frequent breaks); presentation (e.g., questions are read aloud by live reader, prerecorded audio, or synthesized speech; font enlargement); response (e.g., student dictates answer to scribe, student types instead of writing by hand); and "other" (e.g., use of bilingual word lists or dictionaries). The purpose of an accommodation is to remove disadvantages due to conditions that are irrelevant to the construct the test is intended to measure without giving unfair advantage to those being accommodated. An accommodation generally requires prior approval of the organization administering the test and may be contrasted with "universal design" features, which may be allowed to virtually anyone who needs or desires the feature.

The term "targeted proficiency," as used herein, refers to what one intends to measure using an assessment. Targeted proficiency may be defined by the knowledge, skills and other attributes (KSAs) that must be present in order for an individual to be considered to have a "good" (high, adequate, or successful) skill level in the targeted proficiency. The targeted proficiency may typically reflect the intent of the assessment designer in developing the assessment.

The term "effective proficiency," as used herein, is essentially what the assessment actually measures. Specifically, effective proficiency refers to the capability of the test taker to perform well when faced by a particular combination of requirements imposed by specific testing conditions. Effective proficiency may thus be thought of as "expected performance" under a specific set of conditions. Effective proficiency may be influenced by the factors that actually affect performance in an operational assessment setting. The effective proficiency may typically reflect the empirical observation or experience from administering an assessment.

The term "requirement," as used for a given KSA, is a value necessary for "good" (high, adequate or successful) effective proficiency. A focal requirement is the requirement for a focal KSA. An ancillary requirement is a requirement for an ancillary KSA.

Each of the following sets of terms has elements that are used interchangeably: (a) "assessment" and "test;" (b) "examinee," "student" and "test taker;" and (c) "item," "question" and "task."

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "accommodation" is a reference to one or more accommodations and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

The disclosed embodiments may describe a validity framework that clarifies the relationships between accessibility features and validity, thereby clarifying possible strategies for increasing accessibility without undermining validity. The disclosed embodiments may determine requirements for designing tests that are more accessible, for example, to disabled test takers, those with special needs, and/or English language learners.

In an embodiment, a method may evaluate accessibility-related features for tests and testing systems. Such a framework may help design testing systems that are flexible and powerful enough to be used for testing of individuals with a wide range of disability and non-disability profiles and language statuses. Furthermore, the framework may be applied in many different subject areas.

The details of the ECD framework described herein may support a well-defined construct (i.e., targeted proficiency) and illuminate the nature of the performances that should reveal the construct and the tasks and situations that may elicit these performances. In considering issues of accessibility, particular tasks may need to be altered in order to overcome accessibility barriers for individuals with disabilities or English language learners. However, the removal of an accessibility barrier must not simultaneously result in an unfair advantage for the accessibility feature user. Thus, ECD may provide a logical framework for understanding conditions that are favorable or unfavorable to test-score validity for test takers.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
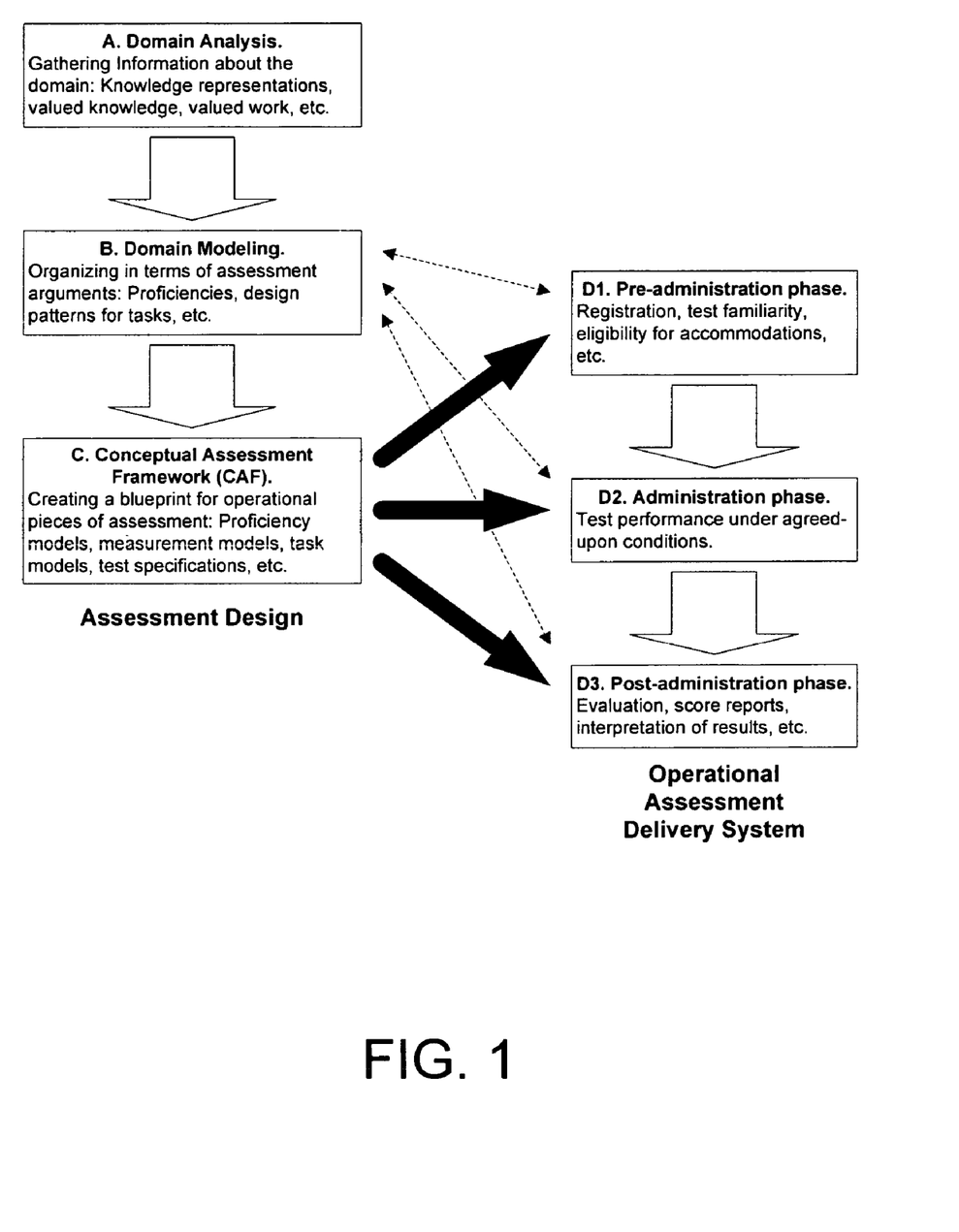
FIG. 1 depicts exemplary layers of an evidence centered assessment design and delivery framework according to an embodiment.

FIG. 1 depicts exemplary layers of an ECD assessment design and delivery framework according to an embodiment. The exemplary ECD framework may denote distinct work requirements for an assessment design, distinct knowledge representations for each layer, and the relationships between layers and within each layer. The framework may include four layers of design and delivery for an assessment system. In an embodiment, three layers may be used for assessment design (Layers A, B and C), and one layer may be used for assessment delivery (Layer D). In FIG. 1, the double-headed hashed arrows may signify that domain modeling informs the development of the operational assessment delivery system and that issues that are expected to arise in the various phases of the delivery system informs the domain modeling process. The solid black arrows may signify that the specifications for assessment construction detailed in the Conceptual Assessment Framework address each phase of the delivery system.

Layer A may represent Domain Analysis, which includes a determination of what the assessment is supposed to accomplish, the test taking population, the constraints for the assessment, and the resources and domain for the assessment. Inclusion and accessibility for all test takers, assessment delivery technologies, and the nature of expertise and measurement validity in the domain in question may each be considered. Thus, Layer A may define the nature of the proficiency and draw upon the test developer's experience and intuition about the nature of proficiency in a domain.

Layer B may represent a Domain Model in which information about the assessment domain is organized in terms of assessment arguments. An assessment argument may include (a) a claim about a test taker possessing a particular level of a targeted proficiency; (b) the data (e.g., scores) that are likely to result if the test taker possesses the particular level of the targeted proficiency; (c) the rationale that explains why the test taker's level in the targeted proficiency would lead to occurrence of the data; and (d) alternative explanations for the test taker's high or low scores. The existence of alternative explanations that are both significant and credible may indicate that validity has been compromised. When such alternative explanations are recognized at the earliest stages of test design, later rework and retrofitting of the assessment may be avoided. Layer B will be described in further detail below.

Layer C may represent a Conceptual Assessment Framework (CAF) in which blueprints for the "machinery" of operational tests are laid out. Layer C may be a formalization for design elements for the operational assessment.

Layer D represents the processes of an operational assessment, including events that occur before, during, and after test administration. Events occurring before test administration may include, for example, a determination of a test taker's eligibility for accommodations and the provision of familiarization materials. Familiarization materials may include information regarding the subject matter tested, question formats used in an assessment, exemplary instructions, and the like. Events occurring after test administration may include, for example, score reporting. Layer D is where the test is actually realized.

Figure 5:
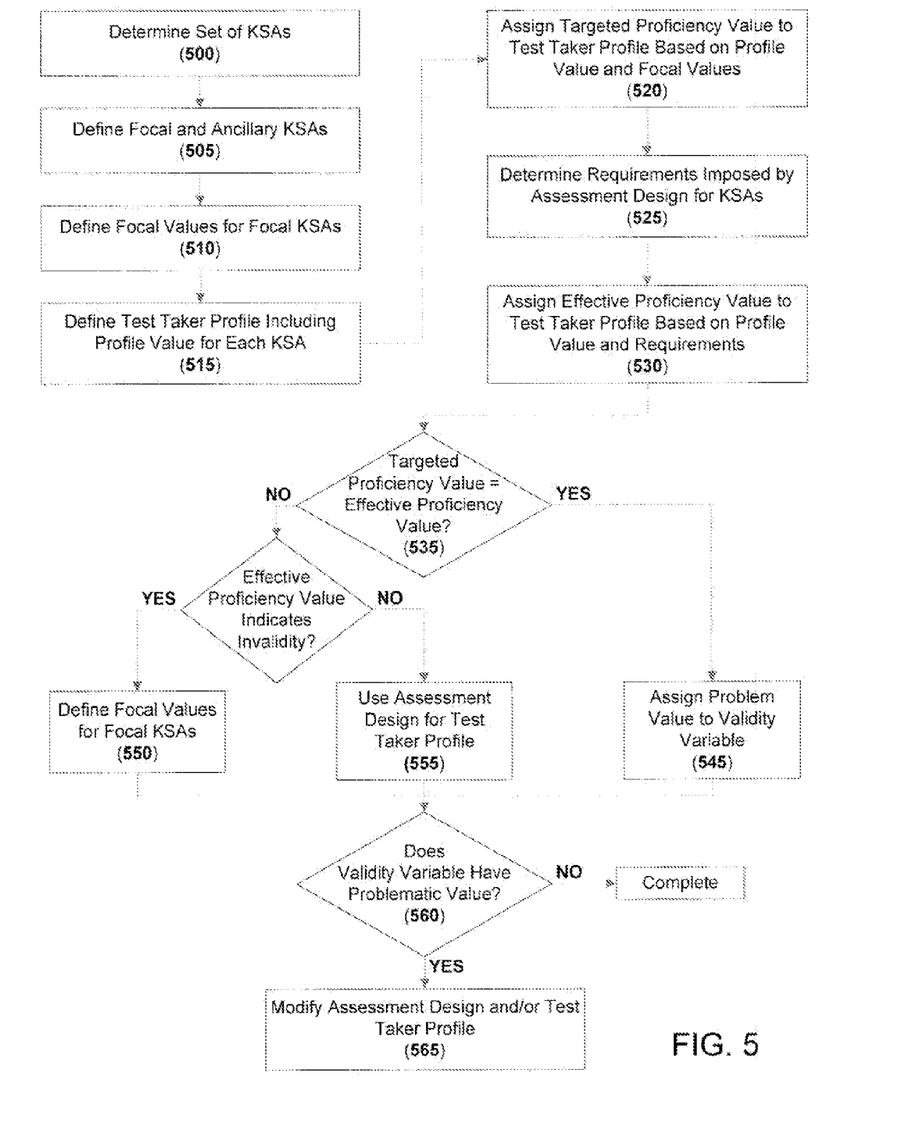
FIG. 5 depicts a general process flow for examining the validity of an assessment design for a test taker profile.

In desgning an assessment, the test designer may consider the target population's diversity and the range of their accessibility needs and preferences. For example, the seven student profiles shown in column 1 of Table 1 may be representative of disabilities and language status groups for a particular target population. These profiles may be described with respect to, for example, seven knowledge, skills and other attributes (reason, know math vocabulary in English, know non-math vocabulary in English, decode, see, hear, know Braille codes) for a test of mathematics. This set of knowledge, skills and other attributes (KSAs) 500 may include both (a) skills that are components skills (e.g., reason know math vocabulary, etc.) of a targeted proficiency that the test is intended to measure (math) and (b) other skills that may be essential for test takers in order to perform well on the test in one or more sets of conditions under which it may be administered (some of which involve accessibility features). The distinction between "a" skills and "b" skills will be described in detail below.

Each student profile (row) may be described by the range of values for various KSAs (columns) that are found within that profile 515. individuals with complex profiles (e.g., multiple disabilities or disabilities coupled with ELL status) are not considered in this table for the sake of simplicity.

TABLE 1

KSA values for seven student profiles

KSAs and Possible Values

| Student Profile | Reason (poor, okay, good, very good) | Know math vocabulary in English (none, poor, okay, good, very good) | Know non-math vocabulary in English (none, poor, okay, good, very good) | Decode (poor, okay, good) | See (no, partial, yes) | Hear (no, yes) | Know Braille codes (no, yes) |
|---|---|---|---|---|---|---|---|
| 1. Blind, able to read Braille | Okay or good or very good | Poor or okay or good or very good | Okay or good or very good | Okay or good | No[a] | Yes | Yes[a] |
| 2. Blind, unable to read Braille | Okay or good or very good | Poor or okay or good or very good | Okay or good or very good | Okay or good | No[a] | Yes | No[a] |

TABLE 1-continued

KSA values for seven student profiles

| Student Profile | Reason (poor, okay, good, very good) | Know math vocabulary in English (none, poor, okay, good, very good) | Know non-math vocabulary in English (none, poor, okay, good, very good) | Decode (poor, okay, good) | See (no, partial, yes) | Hear (no, yes) | Know Braille codes (no, yes) |
|---|---|---|---|---|---|---|---|
| 3. Low vision | Okay or good or very good | Poor or okay or good or very good | Okay or good or very good | Okay or good | Partial[a] | Yes | No |
| 4. Deaf | Okay or good or very good | Poor or okay or good or very good | Okay or good or very good | Okay or good | Yes | No[a] | No |
| 5. Dyslexia | Okay or good or very good | Poor or okay or good or very good | Okay or good or very good | Poor[a] | Yes | Yes | No |
| 6. Non-disabled English language learner | Okay or good or very good | Poor or okay or good or very good | Poor[a] | Okay or good | Yes | Yes | No |
| 7. Non-disabled native speaker of English | Okay or good or very good | Poor or okay or good or very good | Okay or good or very good | Okay or good | Yes | Yes | No |

[a]This KSA value tends to distinguish this student profile from other student profiles.

Note that Table 1 characterizes English language learners as having "poor" knowledge of non-math vocabulary in English but "poor-or-better" knowledge of math vocabulary in English. This characterization may capture the concept that English language learners (in English speaking countries) often receive academic instruction in English and may have greater knowledge of English academic-content vocabulary (e.g., math vocabulary) than knowledge of English non-content vocabulary as a result.

Table 2 may detail the range of accessibility features that are helpful or necessary in overcoming accessibility barriers faced by individuals having the various student profiles. The table may indicate tendencies and may not represent the full diversity that can exist within a test taker profile. Table 2 may represent values pertaining to information access in general rather than access to tests per se. For example, text-to-speech may be important to individuals who are blind or have dyslexia; Braille may be important for individuals who are blind and read Braille; visual alteration, such as enlargement and alteration of contrast and color, may be important for individuals with low vision; and linguistic helps, including a dictionary, spell checking, linguistic simplification and/or presentation of content via manual communication (e.g., American Sign Language) may be helpful for individuals with hearing disabilities, dyslexia, or who are English language learners. As stated above, the use of such accessibility features within test settings may not necessarily be conducive to validity.

TABLE 2

Information access features likely to be desired and/or needed by individuals with different student profiles

| Student Profile | Type of Accessibility Feature | | | | |
|---|---|---|---|---|---|
| | 1. Visually-Displayed Text | 2. Visual Alteration (e.g., Enlargement, Contrast, Color) of Text and/or Graphics | 3. Braille and Tactile Graphics | 4. Readaloud/Audio (e.g., Text-to-Speech, Prerecorded Audio, or Live Reader) | 5. Linguistic Helps (e.g., Dictionary, Spell Checker, Linguistic Simplification and Alteration) |
| 1. Blind, able to read Braille | | | High | High | |
| 2. Blind, unable to read Braille | | | | High | |
| 3. Low vision | High | High | | Medium | |
| 4. Deaf | High | | | | High |
| 5. Dyslexia | High | Medium | | High | High |
| 6. Non-disabled English language learner (ELL) | High | | | Medium | High |

TABLE 2-continued

Information access features likely to be desired and/or needed by individuals with different student profiles

| Student Profile | Type of Accessibility Feature | | | | |
| --- | --- | --- | --- | --- | --- |
| | 1. Visually-Displayed Text | 2. Visual Alteration (e.g., Enlargement, Contrast, Color) of Text and/or Graphics | 3. Braille and Tactile Graphics | 4. Readaloud/ Audio (e.g., Text-to-Speech, Prerecorded Audio, or Live Reader) | 5. Linguistic Helps (e.g., Dictionary, Spell Checker, Linguistic Simplification and Alteration) |
| 7. Non-disabled native speaker of English | High | | | | |

Note 1.
"High" indicates that the feature (or class of features) (columns numbered 1 through 5) is likely to be desired and/or needed for providing access to general information (not tests, per se) for many individuals with the specified given student profiles (rows numbered 1 through 7). "Medium" indicates a lesser likelihood.
Note 2.
The table is not intended to indicate which features should be allowed for any given test.

When designing a test, a test designer may initially define what the assessment is designed to measure. Typically, the assessment is designed to provide an accurate estimate of some targeted proficiency. In order to design an assessment to measure the targeted proficiency, a precise definition of the targeted proficiency may be of great value.

A targeted proficiency may include one or more focal KSAs 505. A focal KSA is a KSA that is an essential component of what the test designer wishes to measure. Accordingly, a test taker must posses each of the focal KSAs in order to be considered as possessing a "good" (as opposed to a "poor") level in the targeted proficiency.

On the other hand, any KSA that is not a focal KSA is an ancillary KSA is 505. Since the set of ancillary KSAs includes all KSAs that are not focal KSAs. the number of ancillary KSAs may be extremely large. Accordingly. when analyzing such KSAs, a test developer should select ancillary KSAs that deserve special attention. For example. for tests of typical academic subjects, the abilities of knitting with yarn ("knitting") and running may be designated as ancillary KSAs. However, knitting and running may not be included in the set of considered ancillary KSAs since they are not nart of the targeted proticiency and the test taker is unlikely to require such KSAs under any set of operational testing conditions for typical academic subjects.

In an embodiment, a simple definition of reading comprehension may specify two focal KSAs: "comprehend" and "decode." In an alternate embodiment, a definition of math may specify a different set of KSAs: "comprehend" and "know math vocabulary in English." The ability to "see," as well as many other abilities, may be ancillary KSAs. Defining "comprehend" and "decode" as focal KSAs for reading comprehension may not indicate the particulars of reading comprehension constructs, but rather may illustrate ways of explicitly specifying what a test developer intends to measure. Whether "decoding" ought to be a focal or ancillary KSA in a given assessment application depends on the purpose of the assessment and the population to which the assessment is assigned. Designating certain ancillary KSAs may add precision to the definition of an assessment beyond that provided by merely identifying focal KSAs.

The process of defining a targeted proficiency may essentially be a choice or policy. However, the process may be informed by information such as knowledge of the KSAs actually needed to perform well in certain situations. In considering such KSAs, a test developer may consider not only KSAs needed in target (criterion) situations by non-disabled native speakers of English but also KSAs needed by individuals with disabilities and English language learners who are receiving reasonable accommodations in the situations. In general, the decision or choice about the definition of the targeted proficiency may be based on multiple considerations, including the assessment's purpose, validity, fairness and/or feasibility.

While the binary focal/ancillary distinction is sufficient for some purposes, further refinements to the definition of the targeted proficiency may be beneficial. This may be achieved by defining levels for the focal KSAs. KSA scales may be constructed in discrete levels such that designating the lowest level of the scale as part of the targeted proficiency is functionally equivalent to saying that the KSA is non-essential and, therefore, an ancillary KSA. Scales constructed in this fashion may capture essential lower-end variations within the test taking population for that test.

Table 3 may depict the case of an English language learner (ELL) examinee who receives a math test in default (standard) conditions. Column 1 of Table 3 lists several KSAs and the possible levels for each KSA (e.g., "Reason" has four levels: poor, okay, good, very good, etc.). Column B-1 lists whether a particular KSA has been designated as either a focal KSA or an ancillary KSA. Column B-2 may assign 510 a required level fix each focal KSA for a test taker to be considered to have a "good" level for the targeted proficiency. For example, to have a "good" level of the targeted proficiency, a test taker may be required to possess at least "good" reasoning "okay" knowledge of math vocabulary in English and "noor" knowledge of non-math vocabulary in English. The information in Table 3 is merely exemplary.

TABLE 3

Derivation of the false-negative outcome for a math test administered to an English language learner under default conditions.[a]

| A. KSAs and Possible Levels [Input] | B. Definition of the Targeted Proficiency [Input] | | C. Test Taker KSA Levels. What are the KSA levels of the test taker? (In "what-if" analyses, these are treated as known) [Input] | D. Possession of Focal KSAs. Does the test taker possess the focal KSA (see column C) at the levels specified in the definition of the targeted proficiency (column B-2)? ("Yes", "No"; else "n/a" where KSA is ancillary) [Intermediate output] | E. Requirements of the Testing Situation. What level of the KSA is required of the test taker in order to have "good" effective proficiency in this operational testing situation? (This is n/a if the KSA is "not required," i.e., if the lowest level of the KSA is sufficient) [Input] | F. Satisfaction of Requirements. Does the test taker's ability (column C) satisfy the requirement (column E)? ("Yes", "No"; else "n/a" where column E is "n/a") [Intermediate output] |
|---|---|---|---|---|---|---|
| | 1. "Focal" or "Ancillary" KSA | 2. Level, If Focal KSA. (Relevant level; else "n/a" where KSA is ancillary | | | | |
| 1. Reason (poor, okay, good, very good) | Focal | Good | Good | Yes | Good | Yes |
| 2. Know math vocabulary in English (none, poor, okay, good, very good) | Focal | Okay | Okay | Yes | Okay | Yes |
| 3. Know non-math vocabulary in English (none, poor, okay, good, very good) | Focal | Poor | Poor | Yes | Okay[b] | No |
| 4. Decode (poor, okay, good) | Ancillary | n/a | Okay | n/a | Okay | Yes |
| 5. See (no, partial, yes) | Ancillary | n/a | Yes | n/a | Partial[c] | Yes |
| 6. Hear (no, yes) | Ancillary | n/a | Yes | n/a | Yes[d] | Yes |
| 7. Know Braille codes (no, yes) | Ancillary | n/a | No | n/a | n/a | n/a |
| I. Outcome. Result of comparing the test taker's level in the targeted proficiency with the effective proficiency [Output] → | False-negative | | G. Level in the Targeted Proficiency ("Good" if column D has zero No's and at least one Yes; otherwise "poor") [Intermediate output] → | Good | H. Effective Proficiency ("Good" if column F has zero No's and at least one Yes; otherwise "poor") [Intermediate output] → | Poor |

[a]Default conditions, in this case, include presentation via visually displayed test (instead of audio or Braille) and without any linguistic helps (dictionaries, etc.)
[b]This requirement for knowledge of non-math vocabulary in English ("good") is an example of an excessive focal requirement.
[c]A person must have at least partial vision in order to see the test.
[d]In this case, the requirement for hearing derives from spoken test directions from the proctor.

The next step may include identifying the test taker's levels in the various KSAs. In the test development phase, a test developer may perform this analysis by generating abilities for hypothetical test takers. Typically, not all of the information presented in Table 3 would be known for a particular test taker. For example, a test taker's levels in the targeted proficiency, which is comprised of focal KSAs, may not be known, since inferring the targeted proficiency is typically the goal of the test. However, other information may have been established, for example, by documentation about the test taker's disability or language status.

Referring back to Table 3, the hypothetical ELL examinee receives a math test in default conditions including presentation via a visually-displayed test (instead of audio or Braille) and without any linguistic helps (dictionaries, etc.). The ELL examinee may be depicted as having "good" reasoning, "okay" knowledge of math vocabulary in English, and (per the definition of "English language learner") a "poor" knowledge of non-math vocabulary in English, as shown in column C of Table 3. Reasoning, knowledge of math vocabulary in English and knowledge of non-math vocabulary in English may be focal KSAs, as depicted in column B. The ELL examinee may also have "okay" decoding and the senses of sight ("see=yes") and hearing ("hear=yes"), but may not know Braille codes ("know Braille codes=no"). These may be the ancillary KSAs.

If the test taker possesses the focal KSAs at the levels specified in the definition of the targeted proficiency, the test taker may possess a "good" level in the targeted proficiency 520. in Table 3, this may be determined by examinine each row in column D, which displays. for each focal KSA, whether the test taker's level (column C) meets-or-exceeds the level specified in the definition of the targeted proficiency (column B-2). Specifically, if zero No's and at least one Yes appear in column D, the test taker's level in the targeted proficiency may be "good." Otherwise the level may be "poor." In the example depicted in Table 3, the ELL examinee has zero No's and three Yes's. Thus, the ELL examinee may have a "good" level in the targeted proficiency, as shown in the cell labeled "G. Level in the Targeted Proficiency." Otherwise the level may be "poor." In the example depicted in Table 3, the ELL examinee has zero No's and three Yes's. Thus, the ELL examinee may have a "good" level in the targeted proficiency, as shown in the cell labeled "G. Level in the Targeted Proficiency."

Next, the test developer may examine the KSAs that are required for good performance in operational test settings. A required KSA may be one that the test taker must satisfy in order to perform well in a specific operational test setting. Analyzing task features for their impact on requirements for various KSAs may include empirical investigation and provide an understanding of the KSAs required for a test taker to perform well. The investigation of requirements may be distinct from, but related to, the effort to define the construct, which distinguishes between focal and ancillary skills.

In this disclosure, requirements for focal KSAs are called "focal requirements," and requirements for ancillary KSAs are called "ancillary requirements." Investigation of requirements for the operational testing situation may be resolved, in part, through empirical research 525. Column E of Table 3 depicts requirements for a math test administered in default conditions (e.g., visually-displayed text as opposed to audio or Braille, etc.).

A well-constructed operational test may impose, focal requirements upon the test taker. In other words, if math vocabulary is a focal KSA for a math test, the test items (questions) may be expected to impose a focal requirement for knowledge of math vocabulary. One way to impose this focal requirement may be by using math vocabulary in the test items. Thus, a connection may exist among the definition of the construct, the KSAs actually required to perform well, and the task performance features (use of math vocabulary) in order to elicit or drive those requirements.

While measuring the targeted proficiency (composed of focal skills) is the primary goal, evidence may be obtained regarding ancillary skills by which the test taker apprehended tasks or provided responses. For example, in tests where seeing, hearing, and typing are defined as ancillary skills, operational testing conditions may impose requirements for these ancillary skills (i.e., ancillary requirements) because the test taker must apprehend the tasks (see, hear) and record answers via, for example, a computer keyboard. The term "ancillary requirements" may equate to the term "access skills," when considered in relation to a particular assessment and manner of administration.

Ancillary requirements may come in many forms. A basic object of accessibility efforts may be to ensure that each test taker can satisfy the ancillary requirements with which they are faced. Whether a specific skill that a test requires (e.g., seeing, hearing, typing) is ancillary or focal may depend upon the definition of the targeted proficiency.

The test developer may determine if the focal and ancillary requirements imposed by the operational testing conditions are met by the test taker's abilities. As shown in column F of Table 3, one may ascertain this by determining whether the test taker's level meets-or-exceeds the required level from column E. In Table 3, Column F depicts that the ELL examinee meets the focal requirements for reasoning and knowledge of math vocabulary and the ancillary requirements for decoding, sight, and hearing. However, the ELL examinee does not meet the focal requirement for knowledge of non-math vocabulary.

The test developer may then determine the effective proficiency for the test taker. Effective proficiency may be a latent variable representing the capability for performance on a test or item under a specific set of testing conditions. Accordingly, effective proficiency may be equivalent to the "true score" in standard psychometrics (i.e., an expected score for performance on a test under the conditions it is administered). As implied by its similarity to the "true score," effective proficiency may be modeled to exclude measurement error.

A test taker's effective proficiency may be closely related to the performance in operational conditions because effective proficiency is a reflection not only of the test takers' levels in focal and ancillary KSAs, but also the focal and ancillary requirements imposed by the operational performance conditions 530. A test taker may have a "good" (as opposed to "poor") level of effective proficiency if the test taker's levels of KSAs meets both the focal requirements and the ancillary requirements. Otherwise, the test taker may possess a "poor" level of effective proficiency.

The effective proficiency of the particular test taker described in Table 3 may be determined by examining whether the focal and ancillary requirements are met. The test taker described in Table 3 meets all of the ancillary requirements but does not meet all of the focal requirements. While the excessive focal requirement for knowledge of non-math vocabulary in English restricts the test taker in Table 3 to a "poor" level of effective proficiency, the requirement may not undermine the validity of a test administered to a non-disabled native speaker of English because a non-disabled native speaker of English has an "okay" or better level in that KSA (by definition). Accordingly, while excessive focal requirements may favor invalidity, the seriousness of the actual impact may depend (among other things) on the characteristics of the specific test taker(s). Specifically, the ELL examinee's knowledge of non-math vocabulary ("poor") (column C) does not meet the requirement for that KSA ("okay") (column E), and, hence, the ELL examinee's effective proficiency is "poor."

Once the targeted proficiency and effective proficiency are defined, the test developer may determine the likely validity of the assessment scores. One aspect of validity may examine the alignment between (a) what one intends to measure and (b) what one is actually measuring, where alignment favors validity and misalignment favors invalidity. Since the targeted proficiency captures what one intends to measure and the effective proficiency essentially captures what one is actually measuring, a comparison (or match) between the targeted proficiency and effective proficiency may determine the alignment 535.

As such, this framework may include structures for representing and reasoning about a core validity issue (whether a test taker's effective proficiency matches their level in the targeted proficiency). While no guarantee exists that a score will be valid, situations may be identified that are virtually certain to yield invalid results. Analyses may be run in a "what-if" fashion as though the test taker's state in the focal and ancillary KSAs were known.

If the outcome of comparing the targeted proficiency with a test taker's effective proficiency is a "match" 535, a score may tend to be valid with respect to this index of validity. Such a match may occur where the outcome is either (a) true-positive (good targeted proficiency and good effective proficiency) 555 or (b( true-negative (poor targeted proficiency and poor effective proficiency) 550. On the other hand, mismatches may suggest invalid, outcomes 545 and may occur if the outcome is either (a) false-positive (poor targeted proficiency and good effective proficiency), representing an unfair advantage for the test taker, or (b) false-negative (good targeted proficiency and poor effective proficiency), representing an unfair disadvantage for the test taker.

As shown in Table 3 in the cell to the right of the cell labeled "G. Level in the Targeted Proficiency," the ELL examinee may possess a "good" level in the targeted proficiency, despite having "poor" effective proficiency for the assessment conditions described in Table 3. The ELL examinee may have a "good" level in the targeted proficiency as indicated by that fact that he possesses each of the focal KSAs (see column D) at the levels specified in the definition of the targeted proficiency (column B-2). As noted earlier, the mismatch between the ELL examinee's "good" level in the targeted proficiency and his "poor" effective proficiency may indicate a "false-negative" outcome and suggest that the ELL examinee is at an unfair disadvantage based on these assessment conditions 560.

Key causes for mismatch may include unsatisfied ancillary requirements and focal requirements that are either excessive or insufficient relative to the KSAs that are specified in the definition of the targeted proficiency. Unsatisfied ancillary requirements and excessive focal requirements may tend to yield false-negative outcomes (unfair disadvantage) and insufficient focal requirements may tend to yield false-positive of outcomes (unfair advantage). The test developer may then determine how to address areas of invalidity. Table 3 may suggest that the invalidity (which was indicated by the false-negative outcome) has a fairly obvious source (i.e., art excessive focal requirement for knowledge of non-math vocabulary in English). Despite the fact that the definition of the construct specifies that merely a "poor" knowledge of non-math vocabulary in English is adequate for a "good" level in the targeted proficiency, the testing conditions may impose a higher ("okay") requirement for that KSA, which constitutes an excessive focal requirement. One solution may be to lower that requirement, such as by using simpler non-math vocabulary 565. An alternate method of overcoming the requirement may be to provide a dictionary of non-math vocabulary for tests of math and science. Language ability may be, depending on the definition of the targeted proficiency, either an ancillary ability or a focal ability. If the linguistic requirements result in unsatisfied ancillary requirements or excessive focal requirements, then the validity of the scores may be threatened and steps should be taken to address the issues.

Continuing our example of excessive focal requirements for non-math vocabulary, if the test developer reduces the focal requirement for knowledge of non-math vocabulary to a proper level, i.e., the level specified in the definition of the targeted proficiency ("poor"), then an ELL test taker's ability may be satisfied by this requirement and his effective proficiency may be "good," yielding a true-positive outcome (i.e., a valid outcome relative to this validity index).

The following strategies may ameliorate the effects of threats to validity:

1. Manage ancillary and focal requirements by ensuring that each test taker can satisfy the ancillary requirements of the assessment and by keeping focal requirements at the levels specified in the definition of the targeted proficiency. Where necessary and feasible, provide accessibility features (e.g., accommodations and "universal design" features) to eliminate excessive ancillary requirements.

2. Expand the range of accessibility features to increase the diversity and number of individuals who can meaningfully participate in tests. Expanding the range of accessibility features may involve modifying or switching methods of test delivery.

3. Modify the definition of the targeted proficiency, if feasible, to make it more amenable to the valid use of accessibility features. For example, by defining "reading" (or "reading comprehension") as excluding decoding, a test developer may make a test more amenable to the readaloud accommodation.

4. Increase the test taker's capacity to satisfy ancillary requirements by, for example, taking steps to improve the quality and effectiveness of practice and familiarization materials if test takers are having difficulty handling a high ancillary requirement for knowledge of how to handle the test format.

5. Obtain additional evidence about targeted proficiencies to increase the use of accessibility features. Typically, a test administrator may rely on a test taker's score(s) as direct evidence of his or her level in the targeted proficiency. However, by allowing the use of additional evidence, one may be able to expand the use of accessibility features. For example, if "reading comprehension" proficiency includes two focal KSAs ("comprehend" and "decode"), a test developer may not allow the readaloud accommodation, since the accommodation may open the possibility that a person with little or no decoding ability would perform well. In such a case, the test taker may gain an unfair advantage. However, if the test developer used an independent and prior measure of decoding as evidence, the readaloud accommodation may be allowed for individuals who possess adequate decoding ability and may not be unfairly advantaged by the use of the accommodation. Such an approach may require careful consideration of the purpose of the test and its intended uses.

6. Modify the eligibility rules to allow only individuals who can satisfy the ancillary requirements of a test to take the test. While this may reduce threats to validity, it may also decrease accessibility for subsections of the potential testing population.

7. Modify reporting practices to help test score users interpret results of using accessibility features. For example, a test administrator may provide information that would allow test score users to know the specific accessibility features or category of features used. For example, testing accommodations may be grouped into three categories based on the likelihood that such accommodations would alter the interpretation of scores, e.g., "are likely" to alter (category 3), "may" alter (category 2) or are "not expected" to alter test-score interpretations (category 1).

Based on the foregoing discussion, three types of threats to validity may be identified that relate to accessibility of tests and assessments: unsatisfied ancillary requirements, excessive focal requirements and insufficient focal requirements.

Unsatisfied ancillary requirements may yield false-negative outcomes and provide an unfair disadvantage for a test taker. An unsatisfied ancillary requirement scenario may occur if a test taker possesses a "good" level in the targeted proficiency, but his or her performance on the test is "poor" because they cannot satisfy an ancillary requirement that is excessive relative to the test taker's abilities. For example, if a particular test as delivered under its default (standard) conditions requires the sense of sight as an ancillary requirement because, for example, the use of a computer monitor imposes the requirement for seeing the test content, a test taker who is blind may not satisfy that ancillary requirement and may face an accessibility barrier. If this test taker actually possesses a "good" level in the targeted proficiency (e.g., mathematics), the outcome may be false-negative. Ancillary requirements may be present in most educational testing, which is typically a form of mental testing. In educational tests, mental or cognitive abilities may be focal, while sensory and physical abilities required to receive test content or to record one's answers may be ancillary. Since valid testing cannot occur without receiving test content or recording one's answers, educational testing may typically impose one or more ancillary requirements.

Accessibility features, including testing accommodations, may be used to reduce or eliminate ancillary requirements for abilities that are adversely impacted by disabilities or language status. For a blind test taker, the accessibility feature may eliminate the ancillary requirement for sight. For a deaf test taker, the accessibility feature may eliminate the ancillary requirement for hearing; for example, test directions ordinarily spoken aloud by a proctor may be signed via some form of manual communication (e.g., ASL) to the deaf test taker. Ancillary requirements may not be a problem unless the test taker cannot satisfy them. The fact that ancillary requirements are numerous and high may not hinder measurement of the targeted proficiency unless an individual cannot satisfy those ancillary requirements.

A false-negative outcome and unfair disadvantage may also occur if excessive focal requirements are present. Whether a focal requirement is excessive may be determined by whether the requirement is excessive relative to those specified in the definition of the targeted proficiency. For example, as shown in Table 3, an excessive focal requirement for knowledge of non-math vocabulary depressed the score of the ELL test taker, resulting in an unfair disadvantage (i.e., a false-negative outcome).

Excessive focal requirements may constitute an accessibility problem if the excessive requirements have a greater negative impact on sub-groups than with non-disabled native speakers of English. However, the problem of excessively difficult vocabulary may affect both non-disabled individuals and sub-groups. In such a case, the test design may be faulty instead of simply posing an accessibility issue. The practice of removing unnecessary linguistic complexity from test items may address both the issue of excessive requirements for focal skills (e.g., esoteric knowledge of math vocabulary on a math test where that skill has been defined as a focal KSA) and the issue of excessive ancillary requirements (e.g., difficult-to-decode words where decoding is an ancillary KSA).

In contrast to the previous two threats that tend to result in an unfair disadvantage to the test taker, the third threat, that of insufficient focal requirements, may result in an unfair advantage for the test taker. This third threat to validity may result from using, for example, math vocabulary that imposed a requirement for only the lowest level of knowledge of math vocabulary ("poor") in order to perform well when the next higher level ("okay") should have been required. Insufficient focal requirements may result in an unfair advantage for the test taker, resulting in unduly good effective proficiency, and hence, unduly good performance by the test taker.

An example of insufficient focal requirements that occurs as a result of an accessibility feature may include the following: If reading proficiency is defined as involving focal KSAs of comprehension ("comprehend") and decoding ("decode"), the readaloud accessibility feature may eliminate the focal requirement for decoding, since content is read aloud a word at a time rather than requiring the test taker to decode words (i.e., decipher words from individual characters). Accordingly, the readaloud accommodation may create an unfair advantage for individuals with "poor" decoding ability and "good" comprehension who would perform well despite having poor reading proficiency, per the definition of reading comprehension. Thus, while excessive ancillary requirements and excessive focal requirements are accessibility barriers, insufficient focal requirements may arise as a side-effect of attempting to address accessibility barriers.

Insufficient ancillary requirements may not present a threat to validity because ancillary requirements can never be too low. Individuals with KSA levels greater than the requirements, such as a non-disabled speaker of English who reads Braille codes taking an assessment (in which knowledge of Braille codes is ancillary) via visually displayed text, simply do not exercise the ancillary KSA (knowledge of Braille codes) when taking the assessment.

Although these three threats are relevant to accessibility issues, they may also be helpful in refining general test development practices.

Bayes Nets

Another way of representing the assessment argument may include Bayes nets (also called "belief networks"). Bayes nets may provide information regarding the interrelationships between numerous variables. For example, Bayes nets may enable a user to determine how a change in one variable affects the value of one or more other variables. In an embodiment, such other variables may be presently unobserved or inherently unobservable. Bayes nets may use probabilities to update beliefs about variables within the system and the implications of the other variables in the system. Bayes nets may represent only one possible method of representing variables known to those skilled in the art. Such alternate methods are included within the following description, as the use of Bayes nets is merely exemplary.

A Bayes net may include a set of variables, a graphical structure connecting the variables, and a set of conditional distributions. Each "node" may represent a random variable that may have any of two or more defined values. Arrows point from a "parent" node to a "child" node and may represent a dependency (i.e., the state of the child node depends on its parent nodes). Conditional probabilities may be assigned to the nodes of the Bayes net. Once constructed, the variables of the Bayes net may be instantiated based on a state of affairs of interest. Values assigned to nodes may then propagate values to other nodes.

A primary benefit of using a Bayes net to model the validity argument of an assessment may be its capacity to represent different parts of an argument and specify very precisely how those parts of the argument should interact. Various parts of the validity argument may be kept separate from each other. For example, a Bayes net may separate the definition of targeted proficiency (a construct) from effective proficiency, allowing one to discern mismatches between the two. In addition, each may be distinct from the examinee's levels in various focal and ancillary KSAs. In addition, other kinds of knowledge may be represented as well, including, but not limited to: (1) knowledge about the requirements for ancillary KSAs based on different presentation formats (e.g., Braille requires a sense of touch, knowledge of Braille codes, and decoding ability, while readaloud—when read a word at a time—may require a sense of hearing but neither decoding ability nor knowledge of Braille codes); (2) knowledge about the amount of test taker skills required to meet demands generated by a task situation (focal and ancillary requirements); and (3) knowledge about how failure to meet a focal or ancillary requirement affects performance in operational testing conditions (e.g., if good eyesight is a requirement, the lack of good eyesight will virtually always result in "poor" effective proficiency).

Figure 2:
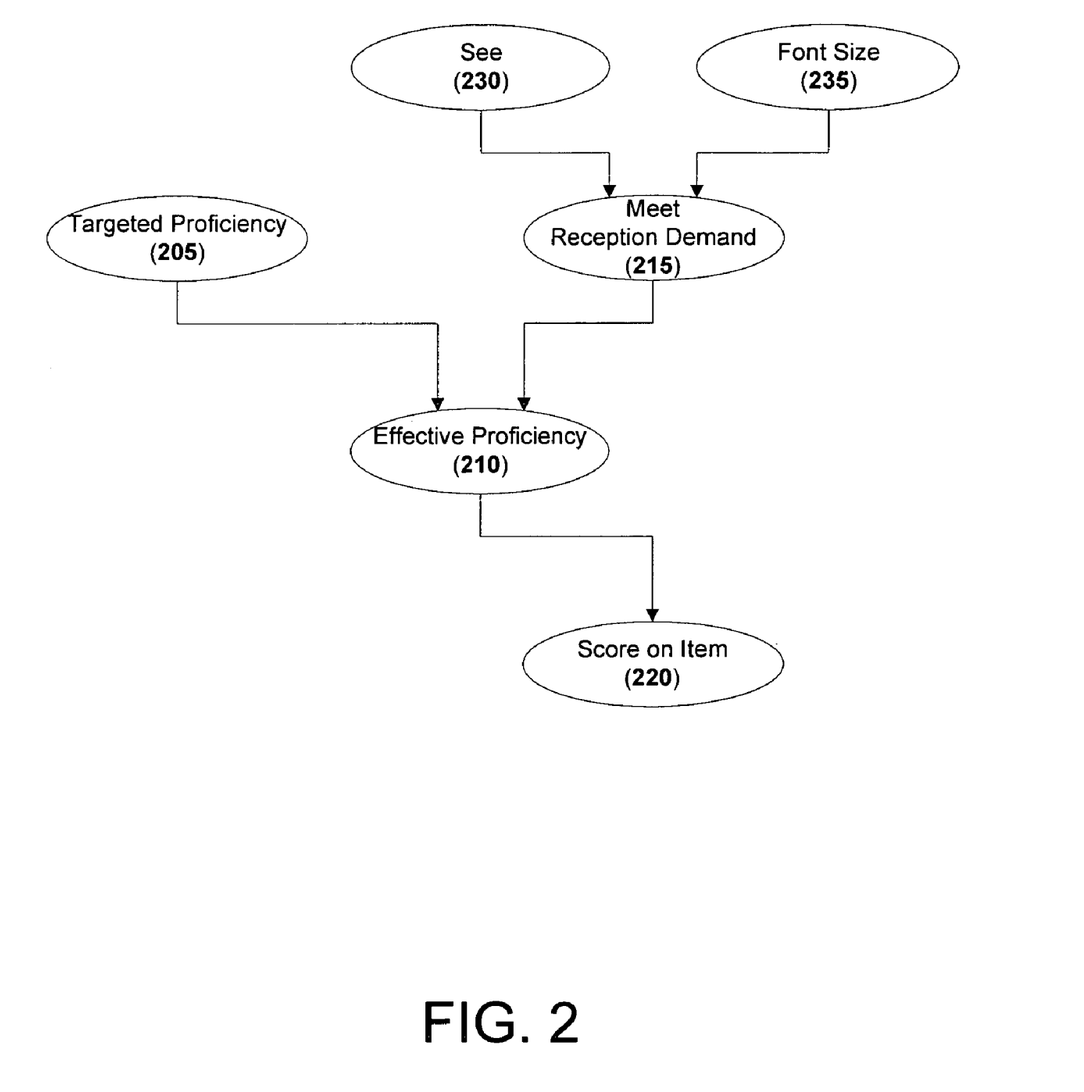
FIG. 2 depicts an exemplary Bayes net for determining targeted proficiency and effective proficiency according to an embodiment.

FIG. 2 (FIG. 10, p. 52) depicts an exemplary Bayes net for determining targeted proficiency and effective proficiency according to an embodiment. In FIG. 2, node 205 may represent the targeted (but invisible) proficiency for an exemplary assessment. The definition of the targeted proficiency, as defined by a test designer, may be informed by a thorough understanding of the KSAs that are required to perform well in criterion situations as well as the uses to which the scores are or will be put. Node 210 may represent the effective proficiency (i.e., expected performance given an operational assessment situation). When the same operationalization works for all test takers, the difference between targeted proficiency 205 and effective proficiency 210 may be negligible. However, when the choice of operationalization of an assessment affect different test takers in different ways, the design decisions for measuring the targeted proficiency 205 and the effective proficiency 210 may become more vital.

As shown in FIG. 2, effective proficiency 210 may have two parents: targeted proficiency 205 and whether the reception demand is met 215. The "meet reception demand" variable 215 may indicate whether a test taker is able to receive the test content. For example, experience may dictate that a person who is blind cannot meet the reception demand for an assessment if it is presented visually.

The behavior of the exemplary Bayes net in FIG. 2 may be as follows: (1) if the targeted proficiency 205 is "good" and the test taker "meets the reception demand" 215, then the effective proficiency 210 is "good;" (2) if either the targeted proficiency 205 is "poor" or the test taker does not "meet the reception demand" 215, then the effective proficiency 210 is "poor." Then, based on the value of the effective proficiency 210, a probability of correctly answering a test question 220 may be assigned. For example, if the effective proficiency 210 is "good," the test taker may answer a test question properly 90% of the time (this value is merely exemplary, but represents that even with knowledge of a subject, test takers may make careless errors). Conversely, if the effective proficiency 210 is "poor," the test taker may answer a test question properly 20% of the time (assuming a 5-answer multiple choice question).

The Bayes net in FIG. 2 may further include parent nodes for the targeted proficiency 205 and the "meets reception demand" 215 nodes. For example, the "meets reception demand" node 215 may include two parents: "see" 230 and "font size" 235. In an embodiment, the "see" node 230 may represent whether a test taker has the sense of sight and may have three values: yes, partial (low vision) and no; and the "font size" node 235 may have two values: large print and regular print. Conditional probabilities for the "meets reception demand" node 215 may then be assigned based on these two parent nodes. For example, the "meets reception demand" node 215 may be "yes" if the "see" node 230 has the value "yes" or if the "see" node 230 has the value "partial (low vision)" and the "font size" node 235 has the value "large print." Otherwise, the "meets reception demand" node 215 may be set to "no."

More complex Bayes nets may be generated to incorporate additional KSAs or other variables depending upon the information to be tested by the assessment and the method(s) for presenting the assessment to test takers.

Inductive Method

The earlier portion of this specification focused on what may be viewed as primarily a deductive method. It treats test taker characteristics as if known (these characteristics are embodied in the test taker profile). The deductive method may be particularly useful in matching assessment conditions (or situations) to test taker profiles so that threats to validity (unsatisfied ancillary requirements, excessive focal requirements, and insufficient focal requirements) may be identified and eliminated. However, once the appropriate match has been made between the test taker and the testing conditions, typical psychometric principles and techniques, such as, for example, item response theory or classical test theory may be applied since the targeted proficiency and effective proficiency match.

The process of estimating the targeted proficiency from scores in an operational setting may entail inductive reasoning (inference). In other words, an inference may be made regarding the test taker's ability from the scores. (Basically, deductive reasoning involves treating the targeted proficiency as if known, and inductive reasoning seeks to infer the value of the targeted proficiency, especially based on item scores.) The process for computing this inductive reasoning may merely include, for example, a psychometric model to accumulate item scores into an estimate of the effective proficiency, which matches the targeted proficiency when threats to validity have been eliminated.

However, Bayes nets may provide a convenient mechanism for flexibly modeling a wide range of situations involving both inductive reasoning (inference) and deductive reasoning. A well-constructed Bayes net may allow the user to set (clamp or enter the evidence for) the values for virtually any combination of nodes and then immediately see the impact of those settings on all the other remaining nodes in the Bayes net. Bayes nets may be particularly capable of handling situations in which uncertainty or partial knowledge exists. Results may be expressed as probability distributions, which may be more accurate representations of an imperfectly known situation than results consisting of a single number. Thus, in an embodiment, a Bayes net may be used both inductively and deductively to take into account diverse information pertaining to the person and situation in order to determine values for non-observable variables based on values for known or observable variables.

Figure 3:
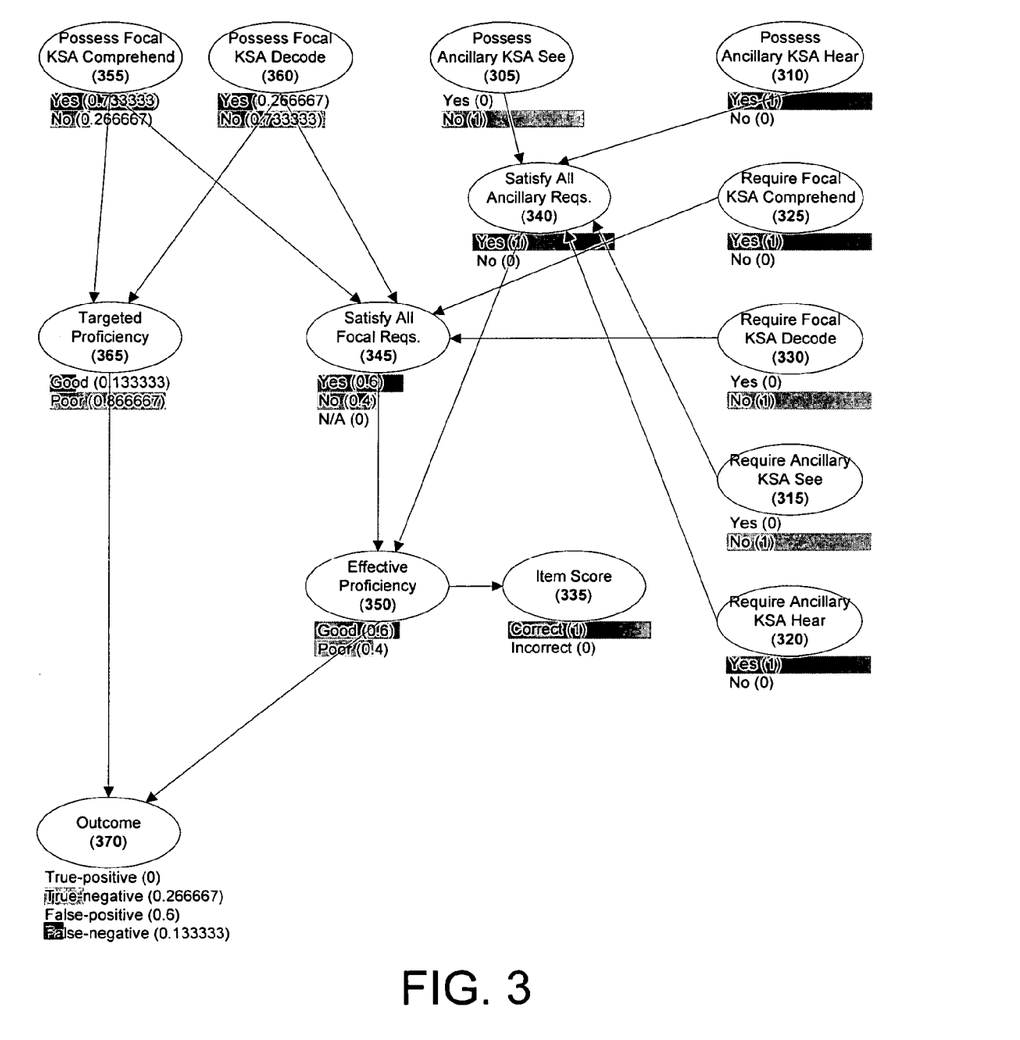
FIG. 3 depicts an exemplary Bayes net representing information pertaining to a test taker according to an embodiment.

FIG. 3 depicts an exemplary Bayes net representing information pertaining to a test taker according to an embodiment. Specifically, FIG. 3 illustrates the situation of a person who is blind and is taking a reading test (defined as including both comprehension and decoding) using a read-aloud accommodation. In FIG. 3, it is assumed that the test taker's focal abilities, comprehension and decoding, are unknown. This is an example of inductive reasoning (in the sense of involving inference about the targeted proficiency) in a relatively complex (non-streamlined) accessibility-related usage. In FIG. 3, the nodes having values with probabilities of only "1" or "0" (shown in parentheses) are nodes to which the values have been set (or clamped) to particular values by the user. These values may be either known or being treated as if known. (It may be possible to have only ones or zeros in unclamped nodes, but these rules regarding nodes hold for this graphic.) Nodes with values with other probabilities (greater than zero and less than one) may be calculated by the Bayes net using one or more of a conditional probability, a prior probability, previously entered testing information, current testing information, a probability distribution for at least a portion of a testing population to which a test taker belongs and the like.

In FIG. 3, the following information may be initially known: the test taker is blind 305 ("Possess Ancillary KSA See=No"), the test taker can hear 310, the test taker is not required to see to access the assessment (e.g., a readaloud version of the assessment is presented to the test taker) 315, the test taker is required to hear to access the assessment 320, comprehension is required for the assessment item 325, decoding is not required for the assessment item (since the readaloud version of the assessment is used) 330, and the test taker answered the item correctly 335. The first four nodes 305–320 may be used to determine whether all of the ancillary requirements are satisfied 340 (in the embodiment shown in FIG. 3, the ancillary requirements are met), and nodes 325 and 330 may be used as inputs to the determination of whether all of the focal requirements are satisfied 345. The other Bayes net nodes that have not been set (or clamped) to a specific value by the user may be computed by the Bayes net algorithm.

In FIG. 3, even though the test taker has performed well on the item as indicated by the correct item score 335, the Bayes net (as shown) indicates that the level of the targeted proficiency is "poor" 365 with a relatively high degree of probability (0.867). This may seem counterintuitive, since a correct score may typically cause the estimate of the targeted proficiency to be higher. However, the Bayes net may include information about the insufficient focal requirement for decoding, and the Bayes net may assign a relatively high probability (0.600) of a false-positive outcome 370 as a result. This is consistent with the tendency of insufficient focal requirements to yield false-positive outcomes. In contrast, by changing the testing situation (not shown) to require decoding 360 ("Require Focal KSA Decode=Yes"), the probability of "poor" targeted proficiency may decrease by more than half (from 0.867 to 0.400), and the probability of a false-positive outcome may decrease from 0.600 to 0.400. Accordingly, the Bayes net, which may include knowledge about requirements and focal and ancillary KSAs as described above, may be able to reason about the validity of accessibility features in rather complex situations.

Thus, the inductive method may determine skill levels for a test taker based on responses to an assessment, the test taker's KSAs, and the KSAs required to access the assessment in the manner in which it was presented to the test taker. For example, probabilities may be estimated for: (a) reasons for poor performance other than low values of the targeted proficiency, such as disabilities for which accessibility barriers may not have been removed, and (b) reasons for good performance other than high values of the targeted proficiency, such as task features which may lower focal requirements beyond the appropriate levels. In an embodiment, the inductive method may be performed in a computer or a computer-based system.

Figure 4:
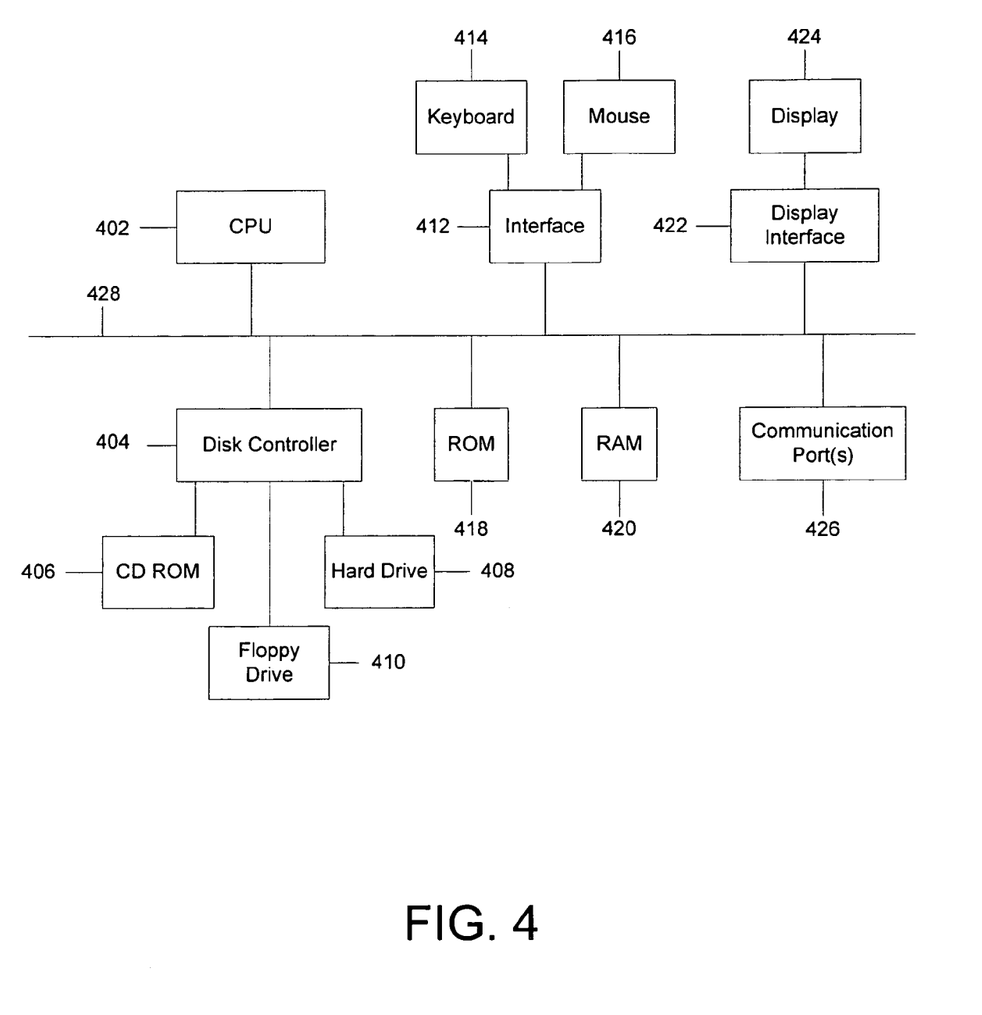
FIG. 4 is a block diagram of exemplary hardware that may be used to contain or implement the program instructions of a system embodiment.

FIG. 4 is a block diagram of exemplary hardware that may be used to contain or implement the program instructions of a system embodiment. Referring to FIG. 4, a bus 428 serves as the main information highway interconnecting the other illustrated components of the hardware. CPU 402 is the central processing unit of the system, performing calculations and logic operations required to execute a program. Read only memory (ROM) 418 and random access memory (RAM) 420 constitute exemplary memory devices.

A disk controller 404 interfaces with one or more optional disk drives to the system bus 428. These disk drives may be external or internal floppy disk drives such as 410, CD ROM drives 406, or external or internal hard drives 408. As indicated previously, these various disk drives and disk controllers are optional devices.

Program instructions may be stored in the ROM 418 and/or the RAM 420. Optionally, program instructions may be stored on a computer readable medium such as a floppy disk or a digital disk or other recording medium, a communications signal or a carrier wave.

An optional display interface 422 may permit information from the bus 428 to be displayed on the display 424 in audio, graphic or alphanumeric format. Communication with external devices may optionally occur using various communication ports 426. An exemplary communication port 426 may be attached to a communications network, such as the Internet or an intranet.

In addition to the standard computer-type components, the hardware may also include an interface 412 which allows for receipt of data from input devices such as a keyboard 414 or other input device 416 such as a remote control, pointer and/or joystick.

An embedded system may optionally be used to perform one, some or all of the operations of the present invention. Likewise, a multiprocessor system may optionally be used to perform one, some or all of the operations of the present invention.

It is to be understood that the invention is not limited in its application to the details of construction and to the arrangements of the components or steps set forth in this description or illustrated in the drawings. The disclosed methods and systems are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

The invention claimed is:

1. A method of examining the validity of an assessment design for a test taker profile, the method comprising:
   determining a set of knowledge, skills and other attributes (KSAs) for an assessment design;
   for each KSA, defining the KSA to be one of a focal KSA and an ancillary KSA;
   defining a focal value for each focal KSA;
   defining a test taker profile, wherein the test taker profile includes a profile value for each KSA;
   assigning a targeted proficiency value to the test taker profile based on the profile value and the focal value for each focal KSA;
   determining, for each KSA, a requirement imposed by the assessment design;
   assigning an effective proficiency value to the test taker profile based on the profile value and the requirement for each KSA;
   if the targeted proficiency value matches the effective proficiency value:
      determining whether an indication of invalidity exists,
      if an indication of invalidity exists, assigning a problematic value to a validity variable, and
      if an indication of invalidity does not exist, selecting the assessment design as an assessment design alternative for the test taker profile;
   if the targeted proficiency value does not match the effective proficiency value, assigning a problematic value to the validity variable; and
   if the validity variable has a problematic value, modifying one or more of the assessment design and the test taker profile.

2. The method of claim 1 wherein assigning a targeted proficiency value comprises:

if, for each focal KSA, the profile value is at least as high as the focal value, assigning a high targeted proficiency value to the test taker profile; and if not, assigning a low targeted proficiency value to the test taker profile.

3. The method of claim 1 wherein assigning an effective proficiency value comprises:

if, for each KSA, the profile value is a least as high as the requirement, assigning a high effective proficiency value to the test taker profile; and if not, assigning a low effective proficiency value to the test taker profile.

4. The method of claim 1 wherein determining whether an indication of invalidity exists comprises:

determining that an indication of invalidity exists if, for an ancillary KSA, the profile value is less than the requirement.

5. The method of claim 1 wherein determining whether an indication of invalidity exists comprises:

determining that an indication of invalidity exists if, for a focal KSA, the requirement exceeds the focal value.

6. The method of claim 1 wherein determining whether an indication of invalidity exists comprises:

determining that an indication of invalidity exists if, for a focal KSA, the requirement is less than the focal value.

7. The method of claim 1 wherein modifying one or more of the assessment design and the test taker profile comprises one or more of the following:

using, in the assessment design, a changed set of familiarization materials to increase the profile value for at least one ancillary KSA;

using, in the assessment design, a changed set of practice questions to increase the profile value for at least one KSA;

changing, in the assessment design, an ancillary KSA to be a focal KSA;

changing, in the assessment design, a focal KSA to be an ancillary KSA;

changing, in the assessment design, the focal value for a focal KSA;

using, in the assessment design, a changed accessibility feature to perform one or more of decreasing an ancillary requirement, decreasing a focal requirement, increasing a focal requirement;

using, in the assessment design, a changed set of eligibility rules for taking the assessment;

using, in the assessment design, a changed set of eligibility rules for using an accessibility feature;

using, in the assessment design, language having one or more of a lower requirement for an ancillary KSA, a higher requirement for a focal KSA, and a lower requirement for a focal KSA;

using, in the assessment design, questions having one or more of a lower requirement for an ancillary KSA, a higher requirement for a focal KSA, and a lower requirement for a focal KSA;

redefining the test taker profile by changing one or more of the set of KSAs for the test taker profile, a number of values of a KSA that is used in the test taker profile, a definition of values of a KSA that is used in the test taker profile, and a definition of the permissible KSA values;

redefining the test taker profile by realigning one or more values for a KSA to broaden the set of test takers represented at a value for a KSA;

redefining the test taker profile by realigning one or more values for a KSA to narrow the set of test takers represented at a value for a KSA;

using, in the assessment design, a changed set of provisions for score reports; and using, in the assessment design, changed guidance materials for the interpretation of score reports.

8. The method of claim 1, further comprising:

if the targeted proficiency value does not match the effective proficiency value, determining whether an indication of invalidity exists.

9. The method of claim 8 wherein determining whether an indication of invalidity exists comprises:

determining that an indication of invalidity exists if, for an ancillary KSA, the profile value is less than the requirement.

10. The method of claim 8 wherein determining whether an indication of invalidity exists comprises:

determining that an indication of invalidity exists if, for a focal KSA, the requirement exceeds the focal value.

11. The method of claim 8 wherein determining whether an indication of invalidity exists comprises:

determining that an indication of invalidity exists if, for a focal KSA, the requirement is less than the focal value.

12. The method of claim 1 wherein the test taker profile comprises one or more profile values characteristic of a language learner.

13. The method of claim 1 wherein the test taker profile comprises one or more profile values characteristic of a test taker having a disability.

14. The method of claim 13 wherein the disability comprises one or more of deafness, blindness, dyslexia, low vision, and neuropathy.

* * * * *